Oct. 26, 1954
W. E. TOLLES
2,692,970
COMPENSATION OF AIRCRAFT MAGNETIC FIELDS
Filed Sept. 2, 1944
2 Sheets-Sheet 1
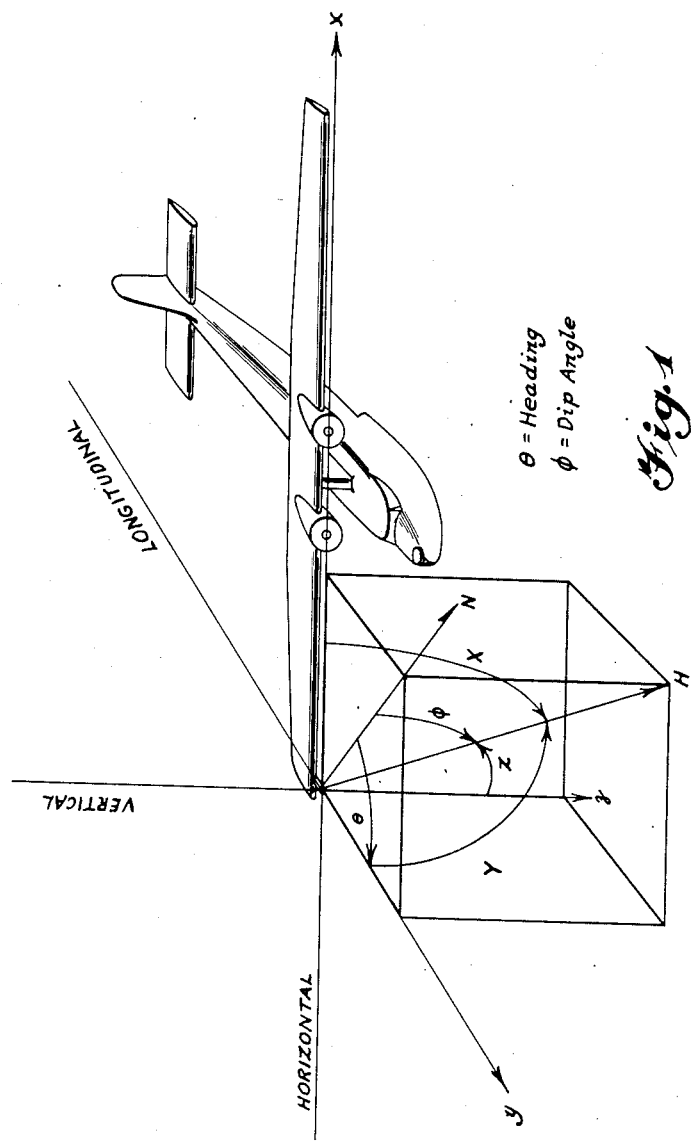
INVENTOR.
Walter E. Tolles
BY
Walter S. Paul.
attorney

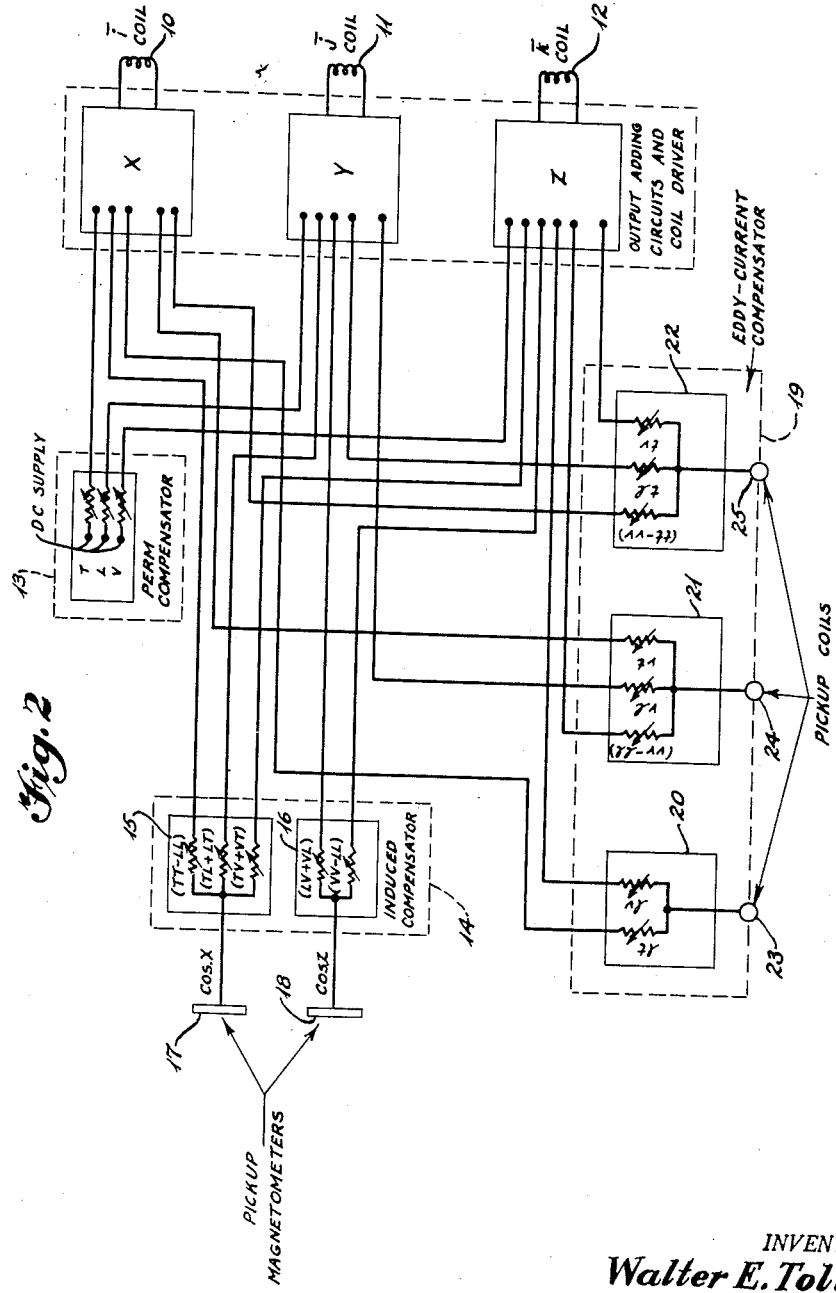

Patented Oct. 26, 1954

2,692,970

UNITED STATES PATENT OFFICE 2,692,970

COMPENSATION OF AIRCRAFT MAGNETIC FIELDS

Walter E. Tolles, Mineola, N. Y., assignor to the United States of America as represented by the Secretary of the Navy Application September 2, 1944, Serial No. 552,516

2 Claims. (Cl. 324—43)

This invention relates to compensation of magnetic fields, and more particularly to the compensation of the effect in a given direction of the magnetic field of an aircraft due to all sources.

Any magnetic field associated with an aircraft adversely affects the operation of magnetically sensitive instruments and measuring devices mounted therein. Compasses, magnetometers and the like which depend for their operation upon the measurement of some component of the earth's magnetic field cannot be successfully employed in an aircraft until at least the components of the aircraft's magnetic field in the sensitive direction of the particular measuring instrument have been compensated.

Considering the nature of the total magnetic field of an aircraft, it will be seen that this magnetic field may be due to contributions from several sources which produce magnetic field components of different types. Ferromagnetic elements in the aircraft structure having high retentivities become permanently magnetized and each of them produces a magnetic field. The sum of all of these permanent magnetic field components is known as the "perm" magnetic field of the aircraft and is constant in magnitude and in direction in respect to the aircraft.

"Soft" ferromagnetic elements in the aircraft structure are magnetized through induction by the earth's magnetic field and each set up an induced magnetic field which varies in magnitude and direction with the geographical location of the aircraft and its attitude in space. The total induced magnetic field of the aircraft is the sum of the induced fields of all "soft" ferromagnetic structural elements, and its contribution to the total magnetic field of the aircraft is accordingly complex in nature.

Additional contributions to the total magnetic field of the aircraft are produced by eddy currents which are induced in sheet conductors, as for example in the metal skin forming portions of the aircraft, or in metallic loops, such as control cable assemblies, whenever the attitude of the aircraft changes. The total eddy-current magnetic field contribution will thus be understood to depend in a complex way upon the geographical location of the aircraft, upon its attitude in space, and upon the rate of change of the attitude of the aircraft.

Thus the total magnetic field of an aircraft is the summation of three types of magnetic fields which vary in different ways as the aircraft maneuvers. In practically every instance, the total magnetic field of an aircraft contains some contributions from magnetic fields of each of the three types considered above, although the proportions in which the various types are present may vary over relatively wide ranges.

When the measuring instrument installed in the aircraft is a portable magnetometer of the type including a magnetometer element and arranged to be continuously oriented in the direction of the earth's magnetic field and to measure magnetic field components in that direction only, special problems are encountered. Since the magnetometer element is so oriented as to maintain a substantially constant attitude in space, the portion of the total magnetic field of the aircraft affecting the output of the magnetometer will also vary with the attitude of the aircraft in space.

Means have been proposed in the past for compensating each of the several types of magnetic fields in aircraft in the absence, in each case, of magnetic fields of any other type. Thus perm fields may be compensated by the positioning of permanent magnets or direct-current electromagnets in such fashion as to exactly neutralize the perm field. The compensating procedure for this purpose is well known in the case of ships, and the procedure for compensating aircraft is analogous.

A method for compensating the induced magnetic field of the aircraft in the absence of other types of magnetic fields to facilitate the operation of a magnetometer mounted in the aircraft and arranged to measure magnetic field components in the direction of the earth's magnetic field is disclosed in copending application Serial No. 547,447, filed July 31, 1944, Compensation of Induced Magnetic Fields, Walter E. Tolles, and a somewhat similar method for the compensation of eddy-current magnetic fields in the absence of magnetic fields of other types is disclosed in copending application Serial No. 550,415, filed August 24, 1944, Eddy-Current Compensation, Walter E. Tolles. In accordance with each of these compensation methods, the total interfering magnetic field of the particular type involved is resolved into components, and a series of maneuvers is performed in such fashion that the magnetic field acting on the magnetometer for a given maneuver is due only to identifiable components of the interfering field. The components so identified are compensated and other maneuvers are performed until all components have been compensated.

It is an object of the present invention to provide means whereby the various magnetic fields contributing to the total magnetic field of an aircraft may, each in the presence of the other, be compensated for their effect on a magnetometer arranged to measure magnetic fields in the direction of the earth's magnetic field.

Accordingly, there is provided a method of compensating the magnetic field of an aircraft to facilitate operation of a magnetometer mounted therein for measuring magnetic field components in a chosen direction which includes choosing a set of reference axes in respect to the aircraft; resolving the perm, induced, and eddy-current magnetic fields of the aircraft into components along these axes; choosing a series of maneuvers such that the output of the magnetometer is in each case due to identifiable components of the perm and induced magnetic fields, and to at least one eddy-current magnetic field component; performing each maneuver of the series in turn, temporarily eliminating the effect of the perm and induced magnetic field components on the magnetometer for each maneuver, and compensating the eddy-current magnetic field component thus identified; thereafter performing a second set of maneuvers such that the output of the magnetometer is due in the case of each maneuver to identifiable components of the perm and induced magnetic fields; and compensating each of these components as identified.

For a better understanding of the invention reference is made to the accompanying drawing, in which:

Fig. 1 is a schematic diagram showing the relationship between the aircraft, the chosen reference axes and the direction of the earth's magnetic field; and Fig. 2 is a schematic diagram of the means utilized in compensating for the unwanted fields.

Referring to Fig. 1, a set of orthogonal reference axes $x$, $y$ and $z$ is chosen in respect to the aircraft. Conveniently, the reference system including these axes has its origin at the location of the magnetometer element and is so chosen that the $x$, $y$ and $z$ axes are parallel respectively to the transverse, longitudinal and vertical axes of the aircraft. Angles X, Y and Z are direction angles indicating respectively the orientation of the $x$, $y$ and $z$ axes in respect to the earth's magnetic vector designated in the drawing by the arrow marked H.

The total magnetic field due to all permanently magnetized structures in the aircraft may be resolved into three components T, L and V, parallel respectively to the $x$, $y$ and $z$ axes. Then if $\vec{i}, \vec{j}$ and $\vec{k}$ are the unit vectors respectively along the $\vec{x}$, $y$ and $z$ axes, the perm magnetic field $\overline{H}_p$ may be expressed as follows:

$$\overline{H}_p = T\vec{i} + L\vec{j} + V\vec{k} \quad (1)$$

Since the magnetometer is arranged to measure only magnetic field components in the direction of the earth's magnetic field, the total perm magnetic field $\overline{H}_p$ may be resolved in the direction of the earth's magnetic vector H. The effective perm magnetic field $H_{pd}$ is then:

$$H_{pd} = T \cos X + L \cos Y + V \cos Z \quad (2)$$

The induced magnetic field of an aircraft effective in the direction of the earth's magnetic field is given by the following expression:

$$H_{ip} = H\ [TT\ \cos^2 X + (LT+TL) \cos X \cos Y + LL \cos^2 Y + (VT+TV) \cos X \cos Z + VV \cos^2 Z + (LV+VL) \cos Y \cos Z] \quad (3)$$

which is derived in copending application Serial No. 547,447, filed July 31, 1944, Compensation of Induced Magnetic Fields, Walter E. Tolles. In this expression, the reference axes are the same as those defined above and the double-letter coefficients TT, LT, etc., have the following significance: The first letter indicates the orientation of the virtual bar representing the sum of all of the field-producing elements of the aircraft structure parallel to one of the reference axes; and the second letter indicates the direction of the induced magnetic field component caused by the virtual bar identified by the first letter.

It will be recognized that, in Equations 2 and 3, angles X, Y and Z are not actually the maneuver angles of the aircraft. It is convenient, therefore, to introduce the following angles: angle $\psi$ which is a measure of the roll of the aircraft about its longitudinal axis, angle $\lambda$ which is a measure of the pitch of the aircraft, angle $\theta$ which is a measure of the heading of the aircraft in respect to magnetic north, and angle $\phi$ which is a measure of the dip angle of the earth's magnetic field. The trigonometric arguments of the several terms of Equations 2 and 3 may then be written in terms of these angles. Accordingly, For rolls ($\psi$):
$$\cos X = \cos \phi \sin \theta \cos \psi + \sin \phi \sin \psi$$
$$\cos Y = \cos \phi \cos \theta \quad (4)$$
$$\cos Z = \sin \phi \cos \psi - \cos \phi \sin \theta \sin \psi$$

and

For pitches ($\lambda$):
$$\cos X = \cos \phi \sin \theta$$
$$\cos Y = \cos \phi \cos \theta \cos \lambda + \sin \phi \sin \lambda \quad (5)$$
$$\cos Z = \sin \phi \cos \lambda - \cos \phi \cos \theta \sin \lambda$$

The total eddy-current magnetic field effective in the direction of the earth's magnetic field may be expressed by the following equations, using the reference axes defined above and as derived in copending application Serial No. 550,415, filed August 21, 1944, on Eddy-Current Compensation, by Walter E. Tolles:

Rolls:
$$H_d = H\dot{\psi}\ [(vv-tt) \cos Z \cos X + vt \cos^2 X - tl \cos Y \cos Z + vl \cos Y \cos Z - tv \cos^2 Z] \quad (6)$$

Pitches:
$$H_d = H\dot{\lambda}\ [-lt \cos X \cos Z + vt \cos X \cos Y + (vv-ll) \cos Y \cos Z + vl \cos^2 Y - lv \cos^2 Z] \quad (7)$$

In these equations, a double-letter nomenclature similar to that used in Equation 3 is employed. In this nomenclature, the first letter $t$, $l$ or $v$ indicates the component of the earth's magnetic field causing a particular component of the total eddy-current magnetic field, and a second letter $t$, $l$ or $v$ denotes the component of the eddy-current magnetic field generated by a change in the earth's magnetic field component designated by the first letter.

For convenience in the identification of magnetometer output signals produced in the course of the compensation procedures of the invention and to make the results reproducible, the aircraft is maneuvered harmonically. Accordingly, let $$\psi = b \sin \omega t$$
and $$\quad (8)$$
$$\lambda = a \sin \omega t$$

From Equations 8, expressions for $\sin \psi$, $\cos \psi$, $\sin \lambda$ and $\cos \lambda$ may be obtained using series expansions. If these quantities are substituted first in Equations 4 and 5 and then in Equations 2, 3, 6 and 7, the trigonometric generating functions of these equations may be expressed in terms of $\theta$, $\phi$ and $\omega t$, the maneuver frequency. Such operations result, in the case of perm and induced fields, in equations of the following form:

$$\cos^2 X = k + A \sin \omega t + B \cos 2\omega t + \ldots \quad (9)$$

while for eddy-current magnetic fields, equations of the following form are obtained:

$$\cos^2 X = A\omega \cos \omega t + B\omega \sin 2\omega t + \ldots \quad (10)$$

Conveniently, the terms obtained by the substitutions outlined above are grouped in tables, as follows:

Examination of Equations 2, 3, 6 and 7 indicates that the following magnetic field compo-

*Rolls*

(PERM)

| Field | Generating function | Fundamental $\sin \omega t$ | Second harmonic $\cos 2\omega t$ |
|---|---|---|---|
| T | $\cos X$ | $b \sin \phi$ | $\frac{b^2}{4} \cos \phi \sin \theta$ |
| V | $\cos Z$ | $-b \cos \phi \sin \theta$ | $\frac{b^2}{4} \sin \phi$ |

(INDUCED)

| Field | Generating function | Fundamental | Second harmonic |
|---|---|---|---|
| TT | $\cos^2 X$ | $b \sin 2\phi \sin \theta$ | $\frac{b^2}{2} (\cos^2 \phi \sin^2 \theta - \sin^2 \phi)$ |
| VV | $\cos^2 Z$ | $-b \sin 2\phi \sin \theta$ | $-\frac{b^2}{2} (\cos^2 \phi \sin^2 \theta - \sin^2 \phi)$ |
| TL+LT | $\cos X \cos Y$ | $\frac{b}{2} \sin 2\phi \cos \theta$ | $\frac{b^2}{8} \cos^2 \phi \sin^2 \theta$ |
| TV+VT | $\cos X \cos Z$ | $-b (\cos^2 \phi \sin^2 \theta - \sin^2 \phi)$ | $\frac{b^2}{2} \sin 2\phi \sin \theta$ |
| LV+VL | $\cos Y \cos Z$ | $-\frac{b}{2} \cos^2 \phi \sin 2\theta$ | $\frac{b^2}{8} \sin 2\phi \cos \theta$ |

(EDDY CURRENT)

| Field | Generating function | Fundamental $\omega \cos \omega t$ | Second harmonic $\omega \sin 2\omega t$ |
|---|---|---|---|
| $vv-tt$ | $\cos X \cos Z$ | $\frac{b}{2} \sin 2\phi \sin \theta$ | $\frac{b^2}{2} (\sin^2 \phi - \cos^2 \phi \sin^2 \theta)$ |
| $tl$ | $\cos Y \cos Z$ | $-\frac{b}{2} \sin 2\phi \cos \theta$ | $\frac{b^2}{4} \cos^2 \phi \sin 2\theta$ |
| $vl$ | $\cos Y \cos X$ | $\frac{b}{2} \cos^2 \phi \sin 2\theta$ | $\frac{b^2}{4} \sin 2\phi \cos \theta$ |
| $vt$ | $\cos^2 X$ | $b \cos^2 \phi \sin^2 \theta$ | $\frac{b^2}{2} \sin 2\phi \sin \theta$ |
| $tv$ | $\cos^2 Z$ | $-b \sin^2 \phi$ | $\frac{b^2}{2} \sin 2\phi \sin \theta$ |

*Pitches*

(PERM)

| Field | Generating function | Fundamental $\sin \omega t$ | Second harmonic $\cos 2\omega t$ |
|---|---|---|---|
| L | $\cos Y$ | $a \sin \phi$ | $\frac{a^2}{4} \cos \phi \cos \theta$ |
| V | $\cos Z$ | $-a \cos \phi \cos \theta$ | $\frac{a^2}{4} \sin \phi$ |

(INDUCED)

| Field | Generating function | Fundamental | Second harmonic |
|---|---|---|---|
| LL | $\cos^2 Y$ | $a \sin 2\phi \cos \theta$ | $\frac{a^2}{2} (\cos^2 \phi \cos^2 \theta - \sin^2 \phi)$ |
| VV | $\cos^2 Z$ | $-a \sin 2\phi \cos \theta$ | $\frac{a^2}{2} (\sin^2 \phi - \cos^2 \phi \cos^2 \theta)$ |
| TL+LT | $\cos X \cos Y$ | $\frac{a}{2} \sin 2\phi \sin \theta$ | $\frac{a^2}{8} \cos^2 \phi \sin 2\theta$ |
| TV+VT | $\cos X \cos Z$ | $-\frac{a}{2} \cos^2 \phi \sin 2\theta$ | $\frac{a^2}{8} \sin 2\phi \sin \theta$ |
| LV+VL | $\cos Y \cos Z$ | $-a (\cos^2 \phi \cos^2 \theta - \sin^2 \phi)$ | $\frac{a^2}{2} \sin 2\phi \cos \theta$ |

(EDDY CURRENT)

| Field | Generating function | Fundamental $\omega \cos \omega t$ | Second harmonic $\omega \sin 2\omega t$ |
|---|---|---|---|
| $lt$ | $\cos X \cos Z$ | $-\frac{a}{2} \sin 2\phi \sin \theta$ | $\frac{a^2}{4} \cos^2 \phi \sin 2\theta$ |
| $vv-ll$ | $\cos Y \cos Z$ | $\frac{a}{2} \sin 2\phi \cos \theta$ | $\frac{a^2}{2} (\sin^2 \phi - \cos^2 \phi \cos^2 \theta)$ |
| $vt$ | $\cos X \cos Y$ | $\frac{a}{2} \cos^2 \phi \sin 2\theta$ | $\frac{a^2}{4} \sin 2\phi \sin \theta$ |
| $vl$ | $\cos^2 Y$ | $a \cos^2 \phi \cos^2 \theta$ | $\frac{a^2}{2} \sin 2\phi \cos \theta$ |
| $lv$ | $\cos^2 Z$ | $-a \sin^2 \phi$ | $\frac{a^2}{2} \sin 2\phi \cos \theta$ | nents must each be made zero in order to compensate the magnetic field of the aircraft acting in the direction of the earth's magnetic field:

Perm: T, L, V
Induced: $(VV-TT)$, $(VV-LL)$, $(TL+LT)$, $(TV+VT)$, $(VL+LV)$
Eddy current: $(vv-tt)$, $(vv-ll)$, $tl$, $tv$, $lt$, $lv$, $vl$, $vt$ In order successfully to compensate the total effective magnetic field of the aircraft, it is necessary that contributions to that field from one type of source be measured and compensated effectively in the absence of contributions to the total effective field from other types of source. Thus perm and induced magnetic field components must be measured and compensated effectively in the absence of eddy-current magnetic fields, or vice versa. Conveniently, and in accordance with the invention, the eddy-current magnetic fields are measured effectively in the absence of perm and induced magnetic fields so far as the effect thereof on a magnetometer arranged to measure magnetic field components in the direction of the earth's magnetic field is concerned.

It will be noted from the tables above that perm and induced magnetic fields result in magnetometer outputs which include a sinusoidal fundamental term and a cosinusoidal second-harmonic term, while eddy-current magnetic fields result in magnetometer outputs which include a cosinusoidal fundamental term and a sinusoidal second-harmonic term. Thus, if the magnetometer output for a given maneuver is of fundamental frequency, that is, of the same frequency as the maneuver, and is cosinusoidal, only eddy-current magnetic field components are present.

It will be recognized that for small angles of roll and pitch, all induced magnetic field sources contributing to the total magnetic field of the aircraft remain substantially constant in magnitude on a given heading. Thus, the induced magnetic field components may be temporarily compensated by suitable permanent magnetic fields produced by direct-current electromagnets which may be adjusted while the aircraft is in flight. Such electromagnets may be mounted wherever convenient in the aircraft and arranged to produce fields along the $x$, $y$, and $z$ axes at the location of the magnetometer element. An examination of the tables will show that in many cases the temporary compensating magnetic fields may be chosen in such a way that their effect on the magnetometer will vary with heading in the same way as the induced magnetic field components to be compensated, so long as the maneuvers are small enough to make the second-harmonic term small in respect to the fundamental term.

Utilizing such temporary compensation, eddy-current magnetic fields are first evaluated and compensated. Thus, for example, if the aircraft is caused to perform harmonic 15-degree rolls of suitable frequency on north or south headings, it can be seen from the table of roll indications that the output of the magnetometer will be proportional to T, $(TL+LT)$, $tl$ and $tv$. The terms T and $(TL+LT)$ may be cancelled for a given heading and maneuver by means of a suitable compensating permanent magnetic field. For this purpose, the compensating permanent magnetic fields are adjusted as the aircraft maneuvers until the magnetometer output includes only a cosinusoidal fundamental term and possibly a sinusoidal second-harmonic term. In general, the second-harmonic term is so small in relation to the fundamental term that it may be neglected. For this particular maneuver, the fundamental term may be made cosinusoidal by means of a (T) permanent compensating magnetic field and the second-harmonic term, if present, may be made sinusoidal by means of a (V) permanent compensating magnetic field. The magnetometer output is then due only to eddy-current magnetic field components and is proportional to $$\omega t l \frac{b}{2} \sin 2\phi - \omega t v \sin^2 \phi \quad (11)$$

while that for a south-heading roll is proportional to $$\omega t l \frac{b}{2} \sin 2\phi + \omega t v \sin^2 \phi \quad (12)$$

These expressions are identical with those appearing in copending application Serial No. 550,415, Eddy-Current Compensation, Walter E. Tolles, to which reference is made above. In accordance with the teaching of that application, $tv$ is compensated using, for example, an electronic eddy-current compensator of the type arranged to produce suitably varying compensating magnetic fields, until the magnetometer outputs are equal, and the residual signal is removed using $tl$ compensation. The eddy-current compensator mentioned above is disclosed in the copending application last mentioned above, but its use is not necessary in all cases since passive compensation, as for example short-circuited turns, may be substituted. The use of the electronic equipment is sometimes to be preferred, however, since adjustments may be made in flight.

In a similar fashion, $(vv-tt)$ and $vt$ may be compensated using east-west rolls, while the perm and induced magnetic field terms are quieted using an (L) permanent magnetic field. In similar fashion, the $vl$ term may be compensated using a northeast heading roll, while the $(vv-ll)$ and $lv$ terms may be compensated using north- and south-heading pitches. The remaining term $lt$ may then be compensated using east- and west-heading pitches.

The eddy-current magnetic field terms having been compensated, it is necessary to compensate the perm and induced magnetic field terms. Accordingly, the aircraft is rolled on a north heading and then on a south heading, producing magnetometer outputs proportional respectively to $$Tb \sin \phi + (TL+LT)\frac{b}{2} \sin 2\phi - (TV+VT) \sin^2 \phi \quad (13)$$

and $$Tb \sin \phi - (TL+LT)\frac{b}{2} \sin 2\phi - (TV+VT) \sin^2 \phi \quad (14)$$

Compensation for the $(TL+LT)$ term, which may be produced either by electronic means or by suitably positioned Permalloy strips, is adjusted until magnetometer outputs on north and south headings are equal and of the same sign, thus compensating this term.

The aircraft is next rolled on north and south headings and the magnetometer output made substantially zero by adjusting the perm magnetic field, this adjustment compensating T temporarily. The aircraft is then rolled on east and west headings, and the magnetometer output made substantially zero using a (V) permanent magnetic field to compensate $(TT-VV)$ and V temporarily. Examination of the tables above will indicate that the temporary compensation so provided on the cardinal heading will also compensate these terms on any heading, since the perm magnetic field contribution and the induced magnetic field contribution vary in the same way with heading.

The above temporary compensation having been carried out, the aircraft is rolled on northeast and northwest headings, obtaining magnetometer outputs proportional respectively to $$-(TV+VT)\frac{b}{2}\cos^2\phi - (LV+VL)b\cos^2\phi \quad (15)$$

and $$-(TV+VT)\frac{b}{2}\cos^2\phi + (LV+VL)b\cos^2\phi \quad (16)$$

Compensation for the $(LV+VL)$ term is adjusted until equal signals of the same sign are obtained on northeast and northwest rolls and the compensation for $(TV+VT)$ term is then adjusted until no magnetometer signal is obtained for these maneuvers, these procedures compensating $(LV+VL)$ and $(TV+VT)$, respectively.

These terms having been compensated, the aircraft is again rolled on north and south headings, the magnetometer output being proportional in each case to $$Tb \sin \phi \quad (17)$$

This term is compensated using a perm magnetic field in the T, or $x$, direction.

Next the aircraft is pitched on east and west headings, obtaining in each case signals proportional to $$La \sin \phi \quad (18)$$

and the L term is compensated in a similar fashion.

A consideration of the above tables indicates that the terms remaining uncompensated at the conclusion of the procedure outlined above are V, $(TT-LL)$ and $(LL-VV)$. In order to separate these terms, advantage must be taken of the fact that V and $(TT-VV)$ produce different types of magnetometer signals for rolls, as shown in the table. For small roll angles under 15 degrees, for example, the indications produced by the two magnetic field components differ but slightly. For larger roll angles, however, as for example angles of 35 to 45 degrees, the two terms no longer produce the same type of signal.

The compensation procedure is accordingly as follows: The aircraft is first rolled on east and west headings with 15-degree amplitude, and magnetometer output signals are eliminated using V compensation. Thereafter, the aircraft is caused to perform a wingup, as for example a right wingup on an east heading or a left wingup on a west heading. If no indication is obtained, there is no $(VV-TT)$ component present. If an indication is obtained, however, that component is present and must be compensated. Simultaneous compensation of V and $(VV-TT)$ then requires simultaneous adjustment of two compensating magnetic fields. Conveniently, this may be done by obtaining, through roll and wingup maneuvers on east and west headings, two sets of data relating the two unknown terms from which the proper proportionality between the two types of compensation may be found.

At the conclusion of the above compensation procedure, the only uncompensated term remaining is $(VV-LL)$. This term may be evaluated through north- and south-heading pitches and compensated. After the over-all compensation has been tested by causing the aircraft to perform relatively violent flight maneuvers, such as clover-leaf turns, the compensation procedure is completed.

Fig. 2 shows schematically the means utilized in compensating for the unwanted fields. Three compensating coils 10, 11 and 12 are provided and according to the above referred to copending applications are adapted to be mounted on mutually perpendicular axes, that is, on the transverse, longitudinal and vertical axes, these being the major axes of the aircraft. The compensator is denoted by numeral 13 and includes a direct-current supply to separate variable resistors for transmission to boxes $x$, $y$ and $z$, the output adding circuits and coil driver. Therefore components of the permanent magnetic fields of the aircraft along the three major axes thereof may be applied to coils 10, 11 and 12.

The induced compensator, illustrated by numeral 14 comprises mixers 15 and 16. Pickup magnetometers 17 and 18 are adapted to be mounted on the transverse and vertical axes of the aircraft to provide the functions cos $x$ and cos $z$, respectively. The outputs from magnetometers 17 and 18 are fed to mixers 15 and 16, respectively. In mixer 15 the output signal from magnetometer 17 is fed through separate attenuators in the form of variable resistors to boxes $x$, $y$ and $z$, from which the signal is supplied to coils 10, 11 and 12, respectively. In mixer 16, the output signal from magnetometer 18 is fed through separate attenuators to boxes $y$ and $z$, from which the signal is supplied to coils 11 and 12, respectively.

The eddy-current compensator, indicated by numeral 19, includes mixers 20, 21 and 22 with associated pickup coils 23, 24 and 25, respectively, these coils being mounted on the $y$, $z$ and $x$ axes, respectively, of the aircraft. The eddy-currents from coil 23 are supplied to mixer 20 where they are applied to separate attenuators, the output of which is fed to boxes $z$ and $x$ where it is in turn fed to coils 12 and 10, respectively. The eddy-currents from coil 24 are supplied to mixer 21 where they are applied to separate attenuators, the output of which is fed to boxes $x$, $y$ and $z$. The output from these latter boxes is fed to coils 10, 11 and 12, respectively. The eddy-currents from pickup coil 25 are supplied to mixer 22 where they are applied to separate attenuators, the output of which is fed to boxes $x$, $y$ and $z$. The output from these latter boxes is applied to coils 10, 11 and 12, respectively.

While the compensation procedure described is applicable in all cases, there may be instances in which additional information as to the magnetic field of the aircraft is available. Such information may be obtained by ground measurement or by analysis of the aircraft structure. In such instances, certain of the steps in the compensation procedure may be omitted. In general, however, and particularly if the additional information is of doubtful validity, the full procedure is to be preferred.

Thus, in general, the following steps are involved in compensating the magnetic fields of an aircraft at some particular point of interest.

It is assumed that we have at hand means of supplying permanent, induced, and eddy-current compensator magnetic fields, and that the only problem at hand is to determine the amount of each of the components of each of the fields necessary to achieve complete compensation.

Examination of the roll and pitch tables herein shows that the signals derived from each of the uncompensated magnetic field components are functions of the variable parameters of the aircraft heading and roll and pitch angle and their time rates of change. And it is this information which makes it possible to discuss a procedure by which complete compensation may be achieved. It is evident that full compensation cannot be achieved unless each of the terms indicated is separately and accurately determined and compensated.

It is evident that a very large number of uncompensated components will give rise to a maneuver signal on any arbitrary heading. The basic approach in this procedure is to choose those headings and maneuvers by which one component and then another can be uniquely determined and compensated, thereby reducing, step by step, the number of undetermined components which are left to deal with.

It is evident from the formulae in the roll and pitch charts that the preferred headings for the initial determination of several of the components are the cardinal headings. It is also evident that having compensated a number of the components by maneuvers on cardinal headings that maneuvers performed on odd multiples of 45° headings will yield information about some of the remaining components.

Complete compensation cannot be achieved without resorting to the utilization of the second-order terms which also are indicated in the roll and pitch charts. It is seen that specific compensation programs may be derived from this general approach, but due to constraints placed on the problem by customary means of aircraft pilotage, the number of possible specific programs will be limited.

What is claimed is:

1. The method of compensating the magnetic field of an aircraft to facilitate operation of a magnetometer mounted therein for measuring magnetic field components in a chosen direction which includes; measuring the perm, induced and eddy-current magnetic fields of the aircraft in components along three mutually perpendicular reference axes; executing a series of maneuvers such that the output of the magnetometer is in each case due to identifiable components of the perm and induced magnetic fields, and to at least one eddy-current magnetic field component; performing each maneuver of the series in turn, temporarily eliminating the effect of the perm and induced magnetic field components on the magnetometer for each maneuver, and compensating the eddy-current magnetic field component thus identified by regulating the current supplied to suitable compensating coils placed on axes parallel to said reference axes; thereafter performing a second set of maneuvers such that the output of the magnetometer is due in the case of each maneuver to identifiable components of the perm and induced magnetic fields; and similarly compensating each of these components as identified.

2. The method of compensating the magnetic field of an aircraft to facilitate operation of a magnetometer mounted therein for measuring magnetic field components in a chosen direction which includes; measuring the perm, induced and eddy-current magnetic fields of the aircraft in components along three mutually perpendicular reference axes; executing a series of maneuvers such that the output of the magnetometer is in each case due to identifiable components of the perm and induced magnetic fields and the eddy-current magnetic fields; performing each maneuver of the series in turn, temporarily eliminating the effect of the perm and induced magnetic field components on the magnetometer for each maneuver, and compensating the eddy-current magnetic field component thus identified by regulating the current supplied to suitable compensating coils placed on axes parellel to said reference axes; thereafter performing a second set of maneuvers such that the output of the magnetometer is due in the case of each maneuver to identifiable components of the perm and induced magnetic fields; and similarly compensating each of these components as identified.

References Cited in the file of this patent

UNITED STATES PATENTS

| Number | Name | Date |
|---|---|---|
| 1,892,826 | Bettison et al. | Jan. 3, 1933 |
| 2,412,617 | Jenkins | Dec. 17, 1946 |

FOREIGN PATENTS

| Number | Country | Date |
|---|---|---|
| 2,741 | Great Britain | of 1854 |